May 12, 1964

C. O. JONKERS ETAL 3,132,486

HYDRAULICALLY OPERATED POWER TRANSMISSION SYSTEMS
AND VEHICLES INCORPORATING SUCH SYSTEMS

Filed Aug. 31, 1960

INVENTORS
C. O. JONKERS
BY F. H. FOCKENS

Mason, Mason & Albright
ATTORNEYS

FIG.2

May 12, 1964 C. O. JONKERS ETAL 3,132,486
HYDRAULICALLY OPERATED POWER TRANSMISSION SYSTEMS
AND VEHICLES INCORPORATING SUCH SYSTEMS
Filed Aug. 31, 1960 11 Sheets-Sheet 4

INVENTORS
C. O. JONKERS
BY F. H. FOCKENS
ATTORNEYS

May 12, 1964  C. O. JONKERS ETAL  3,132,486
HYDRAULICALLY OPERATED POWER TRANSMISSION SYSTEMS
AND VEHICLES INCORPORATING SUCH SYSTEMS
Filed Aug. 31, 1960  11 Sheets-Sheet 5

INVENTORS
C. O. JONKERS
BY F. H. FOCKENS
Mason, Mason & Albright
ATTORNEYS

May 12, 1964 C. O. JONKERS ETAL 3,132,486
HYDRAULICALLY OPERATED POWER TRANSMISSION SYSTEMS
AND VEHICLES INCORPORATING SUCH SYSTEMS
Filed Aug. 31, 1960 11 Sheets-Sheet 6

INVENTORS
C. O. JONKERS
F. H. FOCKENS
BY
Mason, Mason & Albright
Attorneys

C. O. JONKERS ETAL 3,132,486

HYDRAULICALLY OPERATED POWER TRANSMISSION SYSTEMS
AND VEHICLES INCORPORATING SUCH SYSTEMS

Filed Aug. 31, 1960

INVENTOR.
C. O. JONKERS
BY F. H. FOCKENS

Mason, Mason & Albright
ATTORNEYS

United States Patent Office 3,132,486
Patented May 12, 1964

3,132,486
HYDRAULICALLY OPERATED POWER TRANSMISSION SYSTEMS AND VEHICLES INCORPORATING SUCH SYSTEMS
Cornelius Otto Jonkers, Delft, and Foppe Hilbertus Fockens, Maasland, Netherlands, assignors to C. van der Lely N.V., Maasland, Netherlands, a limited-liability company of the Netherlands
Filed Aug. 31, 1960, Ser. No. 53,289
Claims priority, application Netherlands Sept. 15, 1959
33 Claims. (Cl. 60—53)

This invention relates to hydraulically operated power transmission systems of the kind comprising a swash-plate actuated, multiple-piston pump adapted to supply hydraulic pressure medium to a similar multiple-piston motor, means being provided to vary the transmission ratio between the said pump and motor.

According to the invention, there is provided a hydraulically operated power transmission system of the kind set forth, wherein the pump swash-plate is coupled to the motor swash-plate in such a way that a change in the angularity of one swash-plate is accompanied by a change in the angularity of the other such that an increase in the lengths of the strokes of the pump pistons is accompanied by a dissimilar decrease in the lengths of the strokes of the motor pistons and vice versa.

For a better understanding of the invention and to show how the same may be carried into effect, reference will now be made, by way of example, to the accompanying drawings, in which.

Figure 1:
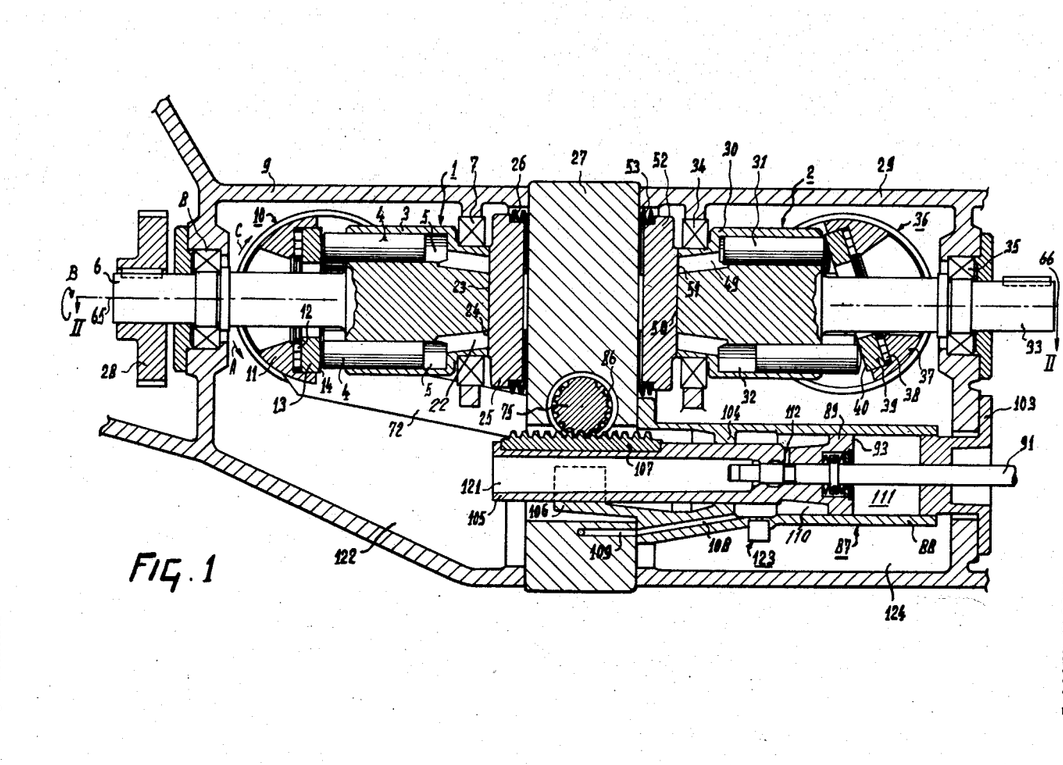
FIGURE 1 is a sectional elevation of a power-transmission system in accordance with the invention.
Figure 2:
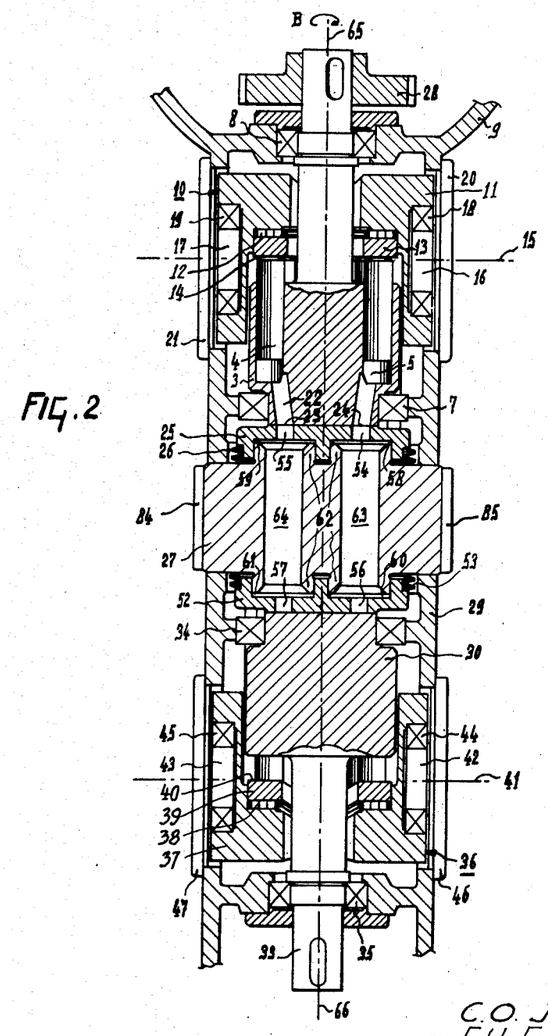
FIGURE 2 is a section taken on the line II—II of FIGURE 1, some of the parts occupying different positions to those shown in FIGURE 1.

Referring to the drawings, the system shown in FIGURES 1 and 2 comprises as its principal features a hydraulic pump 1 and a hydraulically operated motor 2. The hydraulic pump 1 has a housing 3 in which is formed a plurality of chambers 5. Each chamber 5 receives a piston or plunger 4 which is movable longitudinally of the chamber 5. The housing 3 is integral with the inner end of an input shaft 6 and is rotatably supported in a casing 9 by means of bearings 7 and 8. The bearing 7 is disposed around a portion of the housing of reduced diameter whereas bearing 8 surrounds the aforementioned shaft 6. The outer end of the shaft 6 which projects through the casing 9 is provided with a rigidly mounted pinion 28.

A pump swash-plate generally indicated by the reference numeral 10 comprises a pivotable body 11 which supports a ring 13 by means of a roller thrust bearing 12. The body 11 is pivotable about an axis 15 (FIGURE 2) which is afforded by two aligned stub axles 16 and 17 (FIGURE 2) which support the body 11 by means of bearings 18 and 19. The stub axles 16 and 17 are secured to two covers 20 and 21 respectively, the said covers being themselves secured to the casing 9. The ring 13 has a flat surface 14 which bears against the outer domed end of each piston 4. The inner end of each chamber 5 is connected by means of a passage 22 formed in the housing 3 with a surface 23 of the housing 3, the said surface 23 being in sliding engagement with a surface 24 formed on a flat port plate 25. The surface 25 is urged against the surface 24 by means of a dish-spring 26 which extends between a block 27 rigid with the casing 9 and a shoulder formed in the port plate 25.

A second casing 29 is also rigid with the block 27 and contains the hydraulic motor 2 which latter comprises a housing 30 having a plurality of chambers 32 in each of which a piston or plunger 31 is axially movable. The housing 30 is integral with the inner end of an output shaft 33 and is rotatably supported in the casing 29 by means of a bearing 34 which surrounds a portion of reduced diameter of the housing 30 and by means of a bearing 35 which surrounds the aforementioned integral shaft 33. A motor swash-plate generally indicated by the reference numeral 36 comprises a pivotable body 37 which is turnable about an axis 41 (FIGURE 2) afforded by two stub axles 42 and 43 upon which the body 37 is mounted by means of bearings 44 and 45. The stub axles 42 and 43 are rigidly secured to covers 46 and 47 which, in turn, are rigidly secured to the casing 29. The body 37 rotatably supports a ring 39 by means of a roller thrust bearing 38, the ring 39 having a flat surface 40 which is in engagement with the domed head of each of the pistons 31.

Each chamber 32 is connected by means of a passage 49 with a surface 51 of the housing 30, the said surface 51 being in sliding engagement with a surface 50 formed on a flat port plate 52. The surface 50 is urged into sliding engagement with the surface 51 by means of a dish-spring 53 which extends between the aforementioned block 27 and a shoulder formed on the port plate 52.

Figure 9:
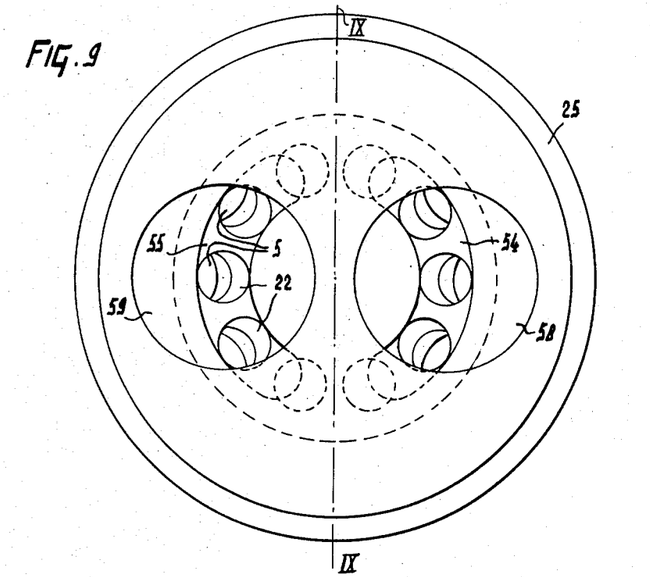
FIGURE 9 is an elevation, to an enlarged scale, of one of the parts of the system shown in FIGURES 1 and 2.

The port plate 25 of the hydraulic pump 1 is provided with two elongated arcuate slots 54 and 55 (see FIGURE 9) which slots constitute a communication between the opposite sides of the said port plate 25, the said slots opening, on the side of the port plate 25 adjacent to the block 27, into recesses 58 and 59.

Substantially identical slots 56 and 57 are formed through the thickness of the port plate 52 of the hydraulic motor 2 and these slots open similarly into recesses 60 and 61 (see FIGURE 2). The block 27 has bosses 62 which engage in the matching recesses 58—61 of the port plates. This arrangement ensures that no substantial movement of the port plates 25 and 52 can take place in directions parallel to the sliding surfaces 23, 24 and 50, 51.

The recess 58 in the port plate 25 communicates with the recess 60 in the port plate 52 by way of a bore 63 formed in the block 27 and the recess 59 communicates similarly with the recess 61 by way of a bore 64. The axis of rotation 65 of the hydraulic pump 1 is coincident with the axis of rotation 66 of the hydraulic motor 2, both these axes being perpendicular to the respective pivotal axes 15 and 41 of the bodies 11 and 37.

Figure 3:
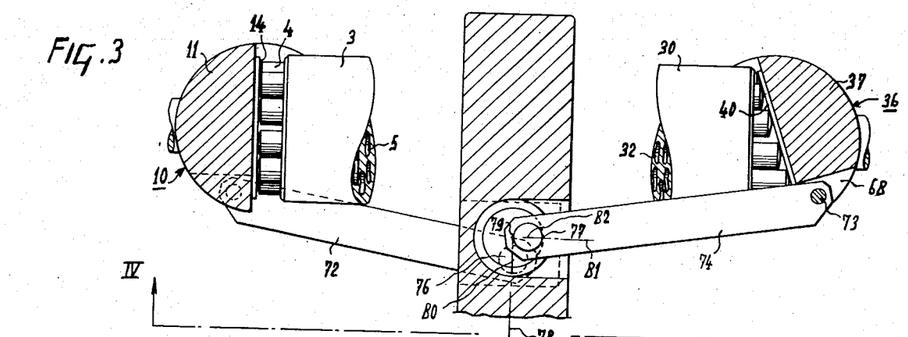
FIGURE 3 is a side elevation of some of the parts shown in FIGURES 1 and 2.
Figure 4:
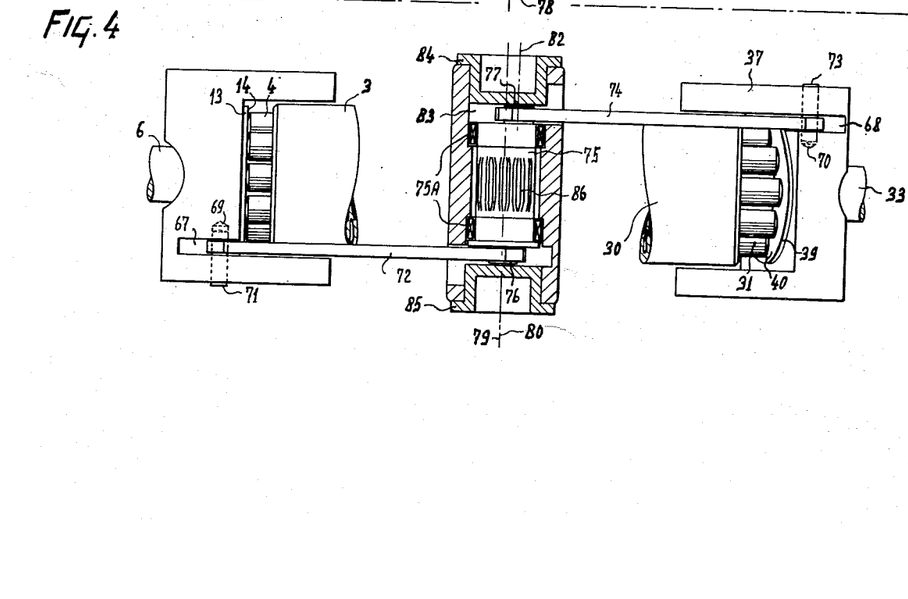
FIGURE 4 is a view taken in the direction of the arrows IV—IV of FIGURE 3.

As shown in FIGURES 3 and 4, the pivotable body 11 is provided with an elongated slot 67 while pivotable body 37 is similarly provided with an elongated slot 68. A transverse bore 69 crosses the slot 67 at right angles thereto and receives a pivot pin 71 about which one end of a coupling rod 72 is turnable. A transverse bore 70 similarly crosses the slot 68 and receives a pivot pin 73 about which one end of a coupling rod 74 is turnable. The bores 69 and 70 are spaced at equal distances from the corresponding pivotal axes 15 and 41 (see FIGURE 2). The end of the coupling rod 72 remote from the pivot pin 71 is journalled on a stub shaft 76 whose longitudinal axis 80 is eccentric with respect to the longitudinal axis 79 of a control shaft in the form of a toothed drum 75 from whose end it projects. In FIGURE 4, axis 79 is directly over axis 80 and these axes coincide. In FIGURE 3, however, the lead lines for axes 79 and 80 are directed to their geometric location at the centers of toothed drum 75 and stub shaft 76, respectively. The end of the coupling rod 74 remote from the pivot pin 73 is similarly journalled on a stub shaft 77 whose longitudinal axis 82 is also eccentric with respect to the longitudinal axis 79 of the toothed drum 75. A perpendicular line of connection 78 (see FIGURE 3) between the axes 79 and 80 is inclined at 90° to a similar perpendicular line of connection 81 between the axes 79 and 82. However, as will be seen from FIGURE 3, the eccentricity of the stub shaft 76 relative to the axis of rotation 79 of the toothed drum 75 is greater than that of the stub shaft 77. The toothed drum 75 is rotatably journalled by means of bearings 75A in a recess 83 formed in the block 27, substantial axial movement of the drum 75 being prevented by means of covers 84 and 85 which fit into the opposite ends of the recess 83 and the drum 75 being provided around the greater part of its periphery with a set of teeth 86 (see FIGURES 1 and 4).

The system also includes an hydraulically operated mechanism which is generally indicated by the reference numerals 87 in FIGURE 1 but which is shown in greater detail in FIGURES 5 to 8. The mechanism 87 consists principally of a piston 89 which is movable in a cylinder 88 which, during operation of the system, is filled with liquid under pressure, and a control rod 91 which is axially slidable in a bore 90 formed in the piston 89. The piston 89 has a surface 92 whose area is smaller than that of the opposite surface 93. A ring 94 formed of two parts secured to one another by bolts 95 is arranged in a recess 94A formed in the control rod 91.

Figure 5:
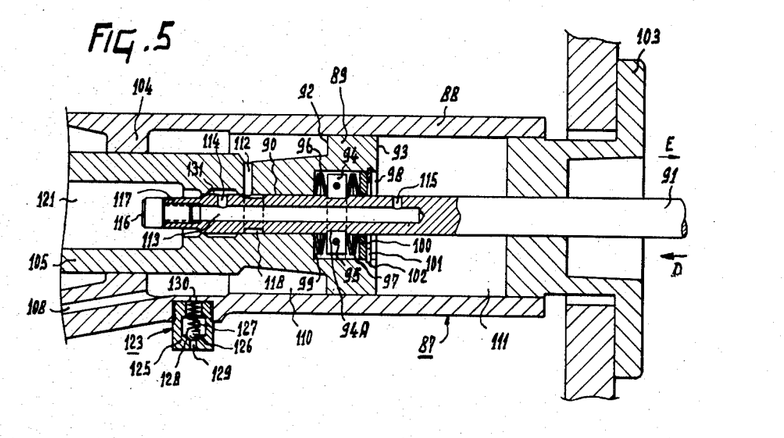
FIGURE 5 is a sectional elevation, to an enlarged scale, of parts of the system shown in FIGURES 1 and 2.
Figure 6:
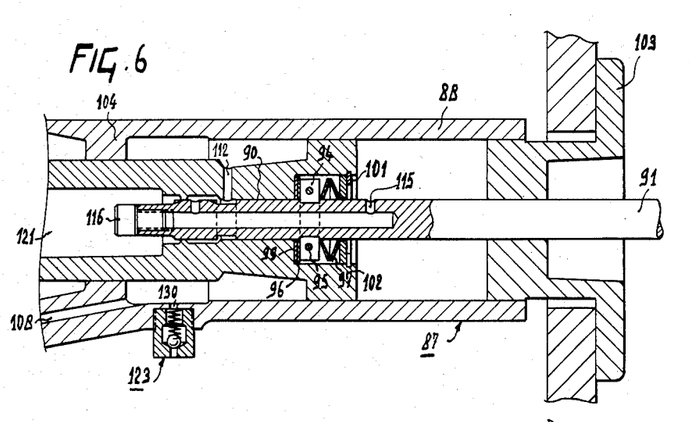
FIGURE 6 is similar to FIGURE 5 but shows some of the parts in a different position.

Dish-springs 96 and 97 are mounted around the control rod 91 on opposite sides of the ring 94, the ring 94 and both the dished springs 96 and 97 being received within a recess 98 formed in the surface 93 of the piston 89. The dish-spring 96 bears between the innermost surface 99 of the recess 98 and one side of the ring 94 whereas the dish-spring 97 bears between the opposite side of the ring 94 and a further ring 100 which is maintained in a position which closes the recess 98 by means of a split ring 101 disposed in a groove 102 formed just inside the mouth of the recess 98. Thus, the control rod 91 is linked with the piston 89 but is movable axially through a small distance in either direction relative thereto against the resilient opposition of either the dish-spring 96 or the dish-spring 97. One end of the cylinder 88 is closed by a cover 103 through a hole in the center of which passes the control rod 91. The opposite end of the cylinder 88 is formed by a cylinder wall 104 through which passes an extension 105 of the piston 89, the said extension 105 being supported by a semi-cylindrical bearing 106 rigid with the body of the cylinder 88. A toothed rack 107 is rigid with the extension 105 and co-operates with the teeth 86 of the toothed drum 75.

A duct 108 is formed in the wall of the cylinder 88 and connects the space 110 on one side of the piston 89 with a further duct 109 formed in the block 27, the duct 109 leading to a source of liquid under pressure. The control rod 91 is formed with an axial duct 113 whose end is closed by a plug 116, two transverse bores 114 and 115 opening into the said duct 113 at different points along the length of the control rod 91. The end 117 of the control rod 91 at which the plug 116 is disposed is of reduced diameter with respect to the major part of the length of the rod and an annular recess 118 is formed in the rod at a point in between the end 117 and the two-part ring 94. Both these parts 117 and 118 of reduced diameter have V-shaped grooves 119 and 120 respectively (see FIGURE 8) which grooves taper into the thicker part of the control rod 91 in directions parallel to the length of the latter. The end 117 of the control rod 91 is disposed in a cavity 121 formed within the extension 105 of the piston 89. The cavity 121 is in communication with a liquid reservoir space 122 and the aforementioned space 110 in the cylinder 88 is in communication via a one-way valve 123 with a further space 124 (see FIGURE 1). The one-way valve 123 (see FIGURE 5) consists of a housing 125 having an inlet passage 129 and an outlet passage 130 in which a ball 126 is pressed against a seating 128 to close the inlet passage 129 by means of a coiled compression spring 127. Liquid can only flow through the one-way valve 123 when the pressure in the said further space 124 exceeds that in the space 110.

The system whose construction has been described operates as follows:

The pinion 28 is coupled with a suitable source of power, such as an internal combustion engine, so that, upon starting the said engine or other prime mover, the input shaft 6 and integral pump housing 3 are rotated about the axis 65 in the direction indicated by the arrow B (FIGURES 1 and 2). When the swash-plate 10 occupies the position shown in FIGURES 1 and 2 in which the surface 14 of the ring 13 lies in a plane perpendicular to the axis of rotation 65, the pistons 4 in contact with the ring 13 are not displaced axially in the chambers 5. Thus, the liquid which fills the chambers 5, the passages 22, the slots 54 and 55, the recesses 58 and 59, the bores 63 and 64, the recesses 60 and 61, the slots 56 and 57, the passages 49 and the chambers 32 is at rest so that it is evident that the hydraulic motor 2 will not be driven at this time.

If the swash-plate 10 is angularly displaced about its pivotal axis 15 in the direction indicated by the arrow A (see FIGURE 1), the surface 14 will be disposed in a plane which is inclined at other than 90° to the axis of rotation 65 so that the pistons 4 whose domed heads bear against the said surface 14 are compelled to perform a reciprocating movement in the chambers 5, the liquid in the chambers 5 thus being displaced by the said pistons 4. The liquid displaced by the pistons 4 is urged through the slot 54, the bore 63 and the slot 56 towards the hydraulic motor 2 where the liquid displaces the pistons 31 so that the housing 30 and output shaft 33 rotate together in the same direction as the housing 3 and input shaft 6. If the swash-plate 10 is turned further in the direction of the arrow A, the stroke of the pistons 4 becomes larger and the amount of liquid displaced during each piston stroke increases. If the stroke of the pistons 31 were to remain the same, the speed of revolution of the housing 30 would increase. The liquid supplied to the motor 2 will in any case, flow back to the pump 1 through the slot 57, the bore 64 and the slot 55.

If the swash-plate 10 is turned in the direction indicated by the arrow C in FIGURE 1, the directions in which the liquid flows through the bores 63 and 64 will both be reversed so that the hydraulic motor 2 will then rotate in a direction opposite to that of the pump 1. The system described can thus operate as a reverse gear.

Since both the pump swash-plate 10 and the motor swash-plate 36 are, in fact, coupled to the toothed drum 75, any movement of the latter about its axis 79 will cause a movement of both the said swash-plates about their respective pivotal axes. As may be seen from FIGURE 3, the swash-plate 36 is always turned in the same direction about its pivotaly axis 41 regardless of the direction in which the swash-plate 10 is turned about its pivotal axis 15. The two swash-plates are, in fact, coupled together in such a way that when the pump swash-plate 10 is turned in either direction so that the stroke of the pump pistons 4 becomes larger, the motor swash-plate 36 is turned in the same direction which is such that the stroke of the motor pistons 31 becomes smaller.

In the position of the body 37 shown in FIGURES 1 and 2, the stroke of each motor piston 31 is a maximum. The body 37 can, in fact, be turned out of the position shown to an extent which is such that the plane containing the surface 40 is inclined at an angle of about 6° to a plane perpendicular to the axis of rotation 66, the strokes of the pistons 31 being a minimum at such time. The arrangement is such that the plane containing the surface 40 can never itself be perpendicular to the axis of rotation 66. If it were possible to diminish the stroke of the motor pistons 31 without changing that of the pump pistons 4, the speed of rotation of the motor 2 would increase. However, in the present case, due to the coupling between the two control members, a decrease in the stroke of the motor pistons 31 is accompanied by a dissimilar increase in the stroke of the pump pistons 4 so that the amount of liquid displaced by the pump 1 in a given time is increased. This has the result that the speed of revolution of the motor 2 increases at a considerably greater rate than would be the case if the body 11 remained stationary as previously discussed.

It can be seen from FIGURE 3 that the perpendicular line of connection 78 extends substantially parallel to the plane containing the surface 14 whereas the perpendicular line of connection 81 (FIGURE 3) is inclined to the plane containing the surface 40. Thus, when the toothed drum 75 is turned about its axis of rotation 79, the angular displacement of the surface 14 from its central position is considerably greater than that of the surface 40. The arrangement is such that the greater the displacement of the pump swash-plate 10 from the central position shown in FIGURE 3, the smaller will become the difference in the rate of angular displacement of the two surfaces 14 and 40. In fact, when the pump swash-plate 10 is at or near its maximum angular displacement (at which the stroke of the pistons 4 is a maximum), its rate of angular displacement will be slightly less than that of the motor swash-plate 36 in response to a movement of the toothed drum 75. The differing eccentrities of the stub shafts 76 and 77 relative to the axis of rotation 79 of the toothed drum 75 is an additional factor which causes variations in the amount by which the angular displacements of the two surfaces 14 and 40 change in response to movement of the toothed drum 75 about its axis of rotation 79. It will be clear that the transmission ratio between the input shaft 6 and the output shaft 33 is varied in an advantageous manner as a result of this arrangement.

The rotation of the toothed drum 75 about its axis 79 is effected by means of the hydraulically operated mechanism 87, which, as previously described, includes a toothed rack 107, the teeth of which are in engagement with the teeth 86 of the drum 75. Thus, when the piston 89 is displaced in either direction, the toothed rack 107 is similarly displaced and the toothed drum 75 is turned in a corresponding direction.

The hydraulically operated mechanism 89 functions in the following manner:

A liquid such as oil is supplied under pressure through the ducts 109 and 108 into the space 110. The oil exerts a force on the surface 92 of the piston 89, which force tends to move the piston 89 towards the right in FIGURE 5. However, a space 111 to the right of the piston 89 is completely filled with oil which cannot escape so that an equilibrium position is reached in which the oil in the space 111 is very slightly compressed. Since the surface 93 is of greater area than the surface 92, the actual pressure in the space 111 is lower than that in the space 110 when the equilibrium is reached. If, in these circumstances, the control rod 91 is displaced in the direction indicated by the arrow D in FIGURE 5, the dish-spring 96 is compressed and the recess 118 is brought into a position in which it communicates with an annular recess 131 formed in the body of the piston extension 105. Since the control rod recess 118 always communicates with a bore 112 leading to the space 110, oil can then flow from the space 110 through the bore 112, the recesses 118 and 131, the bore 114, the duct 113 and the bore 115 to the space 111 so that the pressure in the spaces 110 and 111 is equalized. Due to the fact that the surfaces 92 and 93 upon which the equal pressure acts are different in area, the piston 89 will be moved towards the left in FIGURE 6 (which shows the position of the control rod 91 just described). The control rod 91 does not itself move with the piston 89 so that the piston 89 and control rod 91 rapidly regain the relative positions shown in FIGURE 5 in which the assembly is again in a state of equilibrium. However, if the control rod 91 is moved a further distance in the direction indicated by the arrow D, the piston 89 will be moved a corresponding further distance in the same direction.

Figure 7:
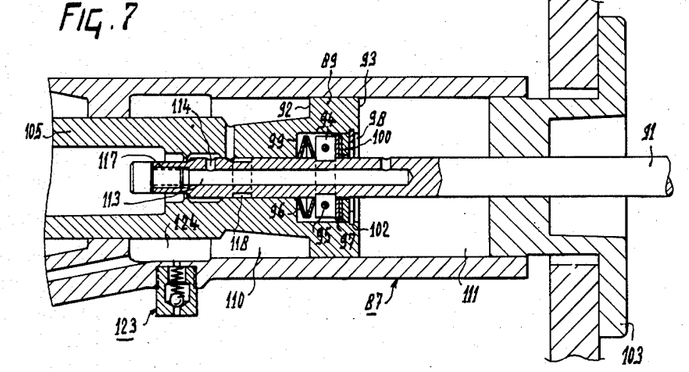
FIGURE 7 is similar to FIGURES 5 and 6 but shows some of the parts in a still further different position.
Figure 8:
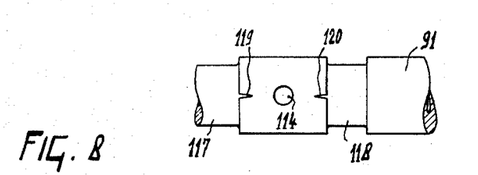
FIGURE 8 is a detail view, to an enlarged scale, of part of one of the members shown in FIGURES 5 to 7.

If, on the other hand, the control rod 91 is moved in the direction indicated by the arrow E in FIGURE 5, the dish-spring 97 will be compressed and the control rod 91 and piston 89 will take up the relative positions shown in FIGURE 7. The recess 131 is then in communication with a cavity 121 formed around the reduced diameter end 117 of the control rod 91 so that the oil trapped in the space 111 can flow to the cavity 121 via the bore 115, the duct 113, the bore 114 and the recess 131. The oil in the space 110 exerts pressure on the piston surface 92 and moves the piston 89 in a direction towards the right in FIGURE 7 so that the equilibrium position shown in FIGURE 5 is rapidly regained. Further displacement of the control rod 91 in the direction of the arrow E will produce a corresponding further movement of the piston 89 in the same direction. The V-shaped grooves 119 and 120 are provided so that piston 89 shall commence to move gradually in either of the cases just described. When the control rod 91 is displaced, communication between the recess 118 or the cavity 121 with the recess 131 is first established by way of the corresponding groove 119 or 120 so that a relatively gradual build-up of the oil flow takes place.

By a careful choice of the dimensions of the various recesses and ducts through which the oil has to pass, the maximum speed attainable by the piston 89 can be regulated. This, in turn, regulates the maximum speed of revolution of the toothed drum 75 about its axis of rotation 79. The recesses and ducts are preferably so dimensioned that the pump swash-plate 10 cannot be brought rapidly into the central position shown in FIGURES 1 to 4 at times when the hydraulic motor 2 is rotating with any substantial speed since, if this provision were not made, it would be possible for hydraulic pressures to build up in the system whose magnitudes would be so great that damage to, or destruction of, the parts thereof could be caused. It will be realized that if the swash-plate 10 were suddenly moved into the said central position during operation, the hydraulic motor 2 and any members coupled therewith would be abruptly stopped due to the fact that the pump pistons 4 could no longer move to accommodate liquid displaced by the motor pistons 31.

It will be seen that the control rod 91 can still be used to move the toothed drum 75 even in the absence of a supply of oil under pressure to the hydraulically operated mechanism 87 since relative movement between the rod 91 and the piston 89 is only possible to an extent corresponding to the difference in thickness between the fully elongated and fully compressed states of the two dished springs 96 and 97. In the absence of a supply of oil under pressure, this relative movement will act merely as a lost motion connection between the control rod 91 and the piston 89, the control rod 91 acting directly to move the piston rod 89 mechanically as soon as the said lost motion has been taken up.

As previously described, the space 110 communicates with a further space 124 by means of a one-way valve 123. This is in order to meet the case in which the piston 89 is moved in the direction indicated by the arrow E in the absence of a supply of oil under pressure through the duct 108. In these circumstances, a partial vacuum may be induced in the space 110, which partial vacuum resists movement of the piston 89 in the direction E. If this should occur, oil will flow through the one-way valve 123 from the further space 124 to break the partial vacuum in the space 110 due to the fact that the pressure in said further space 124 will exceed that in the space 110. As soon as the control rod 91 is released and the piston 89 tends to move back in the direction indicated by the arrow D, the one-way valve 123 will close and the various parts will return to the equilibrium relationship shown in FIGURE 5.

In the system just described, the port plates 25 and 52 are freely movable in directions parallel to the axes of rotation 65 and 66 since the bosses 62 co-operate with the recesses of the port plates in a manner which allows a substantial degree of relative movement in such directions. However, as previously stated, no substantial amount of movement of the port plates 25 and 52 is possible in directions perpendicular to the axes 65 and 66.

Consideration will now be given to the forces which act in the neighborhood of the sliding surface 23 (FIGURES 1 and 2). During operation of the system, a force directed towards the right in FIGURE 1 acts at this surface, the said force being equal to the sum of the operative surfaces of the various pistons 4 multiplied by the pressures exerted by these pistons. There are ten pistons 4 of which five always form the high pressure or delivery side of the pump 1 whereas the remaining five form the low pressure or receiving side of the pump. In order that the force just mentioned shall not tend to cause disengagement of the housing 3 and the port plate 25, the surface area of the recess 58 in the port plate 25 is equal to half the total operative surface of all the pistons which, in the present case, is equal to five times the operative surface of one piston 4. The operative surface of the recess 59 has the same area as that of the recess 58. The term "operative surface of a piston" is to be interpreted as meaning the total surface area of the piston which has a component acting in a plane at right angles to the direction of movement of the piston.

If desired, a plurality of smaller recesses may be used in place of recesses 58 and 59. This can be seen from FIGURE 9 in which a view of the pump 1 is shown, the hydraulic motor 2 and the intermediate block 27 being omitted. It will be assumed for the sake of illustration that the high pressure or delivery side of the pump 1 is located on the right hand side of the line IX—IX with the low pressure or return side of the pump on the opposite side thereof. Thus, the five pistons 4 on the right hand side of the line IX—IX will exert a force at the surface 23 which is substantially equal to the product of their total surface area and the pressure which is exerted by them. The same force is also exerted in an opposite direction on the surface of the recess 58 in the port plate 25 since the area of this surface is five times that of a single piston 4 whereas the pressure exerted is the same. The recess 58 is so positioned with respect to the chambers 5 that the resultant of the forces acting on the high pressure side of the housing 3 and those acting on the port plate 25 are at least substantially co-linear. In the same way the resultant of the forces acting on the low pressure side of the housing 3 and those acting on the surface of the recess 59 are at least substantially co-linear. Since, as has just been described, these forces are equal to one another and act in opposite directions, they will at least substantially cancel one another out so that no appreciable force will tend to cause separation between the housing 3 and the port plate 25. The port plate 52 is arranged in a substantially identical manner with respect to the housing 30 whereby a similar state of substantial equilibrium is also maintained between these parts when the system is in operation.

Figure 10:
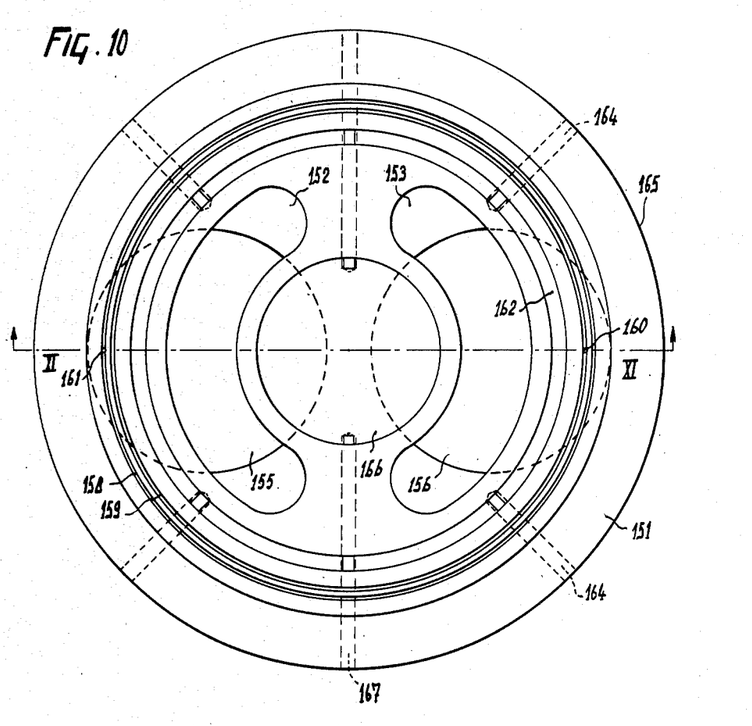
FIGURE 10 is similar to FIGURE 9 but shows an alternative embodiment.
Figure 11:
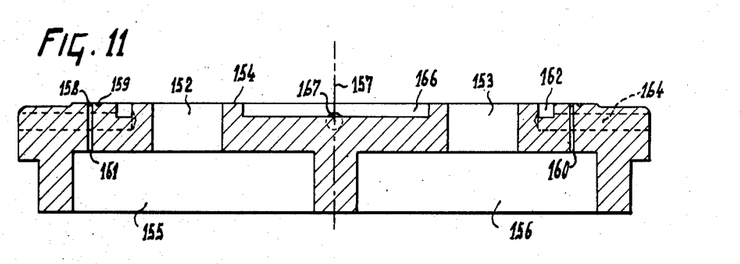
FIGURE 11 is a section taken on the line XI—XI of FIGURE 10.

FIGURES 10 and 11 show an alternative embodiment of a port plate which may be used in place of the port plates 25 and 52 shown in FIGURES 1 and 2. The port plate 151 shown in FIGURES 10 and 11 has two arcuate slots 152 and 153 which constitute a communication between a sliding surface 154 and two recesses 155 and 156. The port plate 151 has an axis 157 which, when the port plate is in position, will substantially coincide with the axis of rotation of the pump or hydraulic motor concerned. The sliding surface 154 is formed with two concentric grooves 158 and 159, the groove 158 communicating with the recess 155 by way of a bore 160 and the groove 159 similarly communicating with the recess 156 by way of a bore 161. The grooves 158 and 159 are concentrically arranged with respect to the aforementioned axis 157 and are both located further from this axis than are the arcuate slots 152 and 153. Between the said grooves and the said slots a circular duct 162 whose center of curvature is also afforded by the axis 157 is formed in the sliding surface 154. This duct 162 communicates by way of bores 164 with the outer periphery 165 of the port plate 151. A still further circular recess 166 is formed in the center of the sliding surface 154 of the port plate 151 and this recess also communicates with the outer periphery 165 by way of ducts 167. The arrangement is such that a film of oil can be maintained between the sliding surface 154 and the co-operating sliding surface of the corresponding housing so that friction between these parts can be substantially reduced in an advantageous manner. The port plate 151 is adapted to operate in the following manner:

If the slot 152 is in communication with the high pressure side of a hydraulic pump or motor of the kind previously described whereas the slot 153 is in corresponding communication with the low pressure side, a small quantity of oil will leak from the slot 152 onto the sliding surface 154 and the other sliding surface cooperating therewith. The pressure exerted by this oil will, of course, tend to separate the two sliding surfaces but the duct 162 and the recess 166 are in such close proximity to the slots 152 and 153 that the oil pressure just mentioned can only build up to an extent which is sufficient to support a film of oil of a thickness adequate to reduce the friction between the two surfaces. The grooves 158 and 159 will be constantly fed with oil under pressure from the recesses 155 and 156 by way of the bores 160 and 161. Owing to the small cross-sectional areas of the two grooves, which may be each of the order of between 0.5 and 1.0 square millimeter, a film of oil under pressure will build up between the sliding surfaces around the two grooves whose pressure magnitude at any point will depend to a great extent upon the proximity of that point to the location at which the bore 160 or 161 opens into the groove 158 or 159 respectively. By a suitable choice of the dimensions of the grooves 158 and 159 and the bores 160 and 161, the co-operating sliding surfaces will be urged away from one another to an extent which is just sufficient to reduce friction to a minimum while preventing any substantial leakage of oil from around the edges of the co-operating surfaces and through the ducts 164 and 167.

Figures 12, 13, 16, 17:
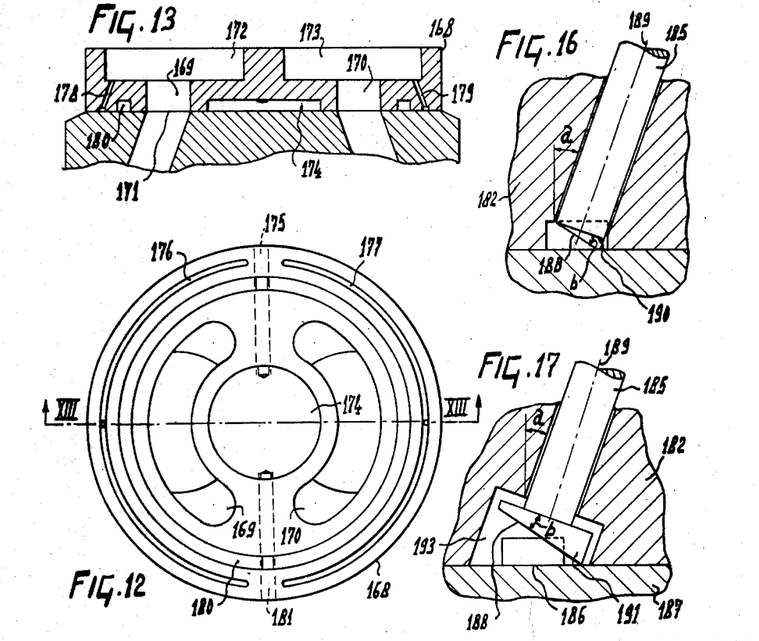
FIGURE 12 is a view similar to FIGURES 9 and 10 but on a smaller scale, showing a further alternative embodiment.
FIGURE 13 is a section taken on the line XIII—XIII of FIGURE 12.
FIGURE 16 is similar to FIGURE 15 but shows a modified construction.
FIGURE 17 is similar to FIGURES 15 and 16 but shows a further modified construction.

FIGURES 12 and 13 show a further alternative embodiment of a port plate which may be used in a system in accordance with the invention. The port plate 168 has two arcuate slots 169 and 170 which, in a manner similar to that previously described, constitute connections between the sliding surface 171 and corresponding recesses 172 and 173. A central recess 174 is provided in the port plate 168 which recess communicates with the outer periphery of the latter by way of two bores 175 and 181. The port plate 168 is also provided with two semi-circular grooves 176 and 177 which are located close to the periphery of the plate and communicate with the recesses 172 and 173 by way of bores 178 and 179 respectively. A circular duct 180 disposed between the slots 169 and 170 and the grooves 176 and 177 also communicates with the outer periphery of the plate 168 by way of the aforementioned bores 175 and 181. This port plate operates in a very similar manner to that shown in FIGURES 10 and 11, oil from the slots 169 and 170 from the grooves 176 and 177 in excess of that required to maintain the film between the sliding surfaces passing either directly to the periphery of the plate 168 or through the bores 175 and 181 by way of the recess 174 or the duct 180.

Figure 14:
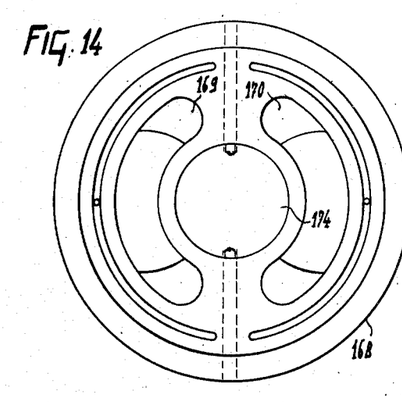
FIGURE 14 is similar to FIGURE 12 and shows a still further alternative embodiment.

FIGURE 14 shows a further port plate which is similar to that shown in FIGURES 12 and 13 and in which the same reference numerals are used to designate like parts. In this case, however, the circular duct 180 shown in FIGURES 12 and 13 is omitted, thus tending to reduce the leakage of oil from between the sliding surfaces.

Figure 15:
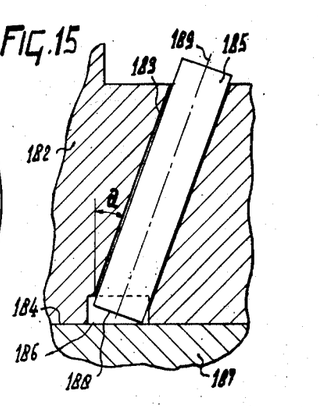
FIGURE 15 is an elevation, partly in section, showing a detail of part of a member of the kind shown in FIGURES 12 to 14.

FIGURES 15 to 17 show various arrangements by means of which blockage of the bore through which oil is fed from the recesses on one side of the port plate to the grooves on the other side thereof is prevented. A bore 183 of this kind as shown in FIGURE 15 is inclined at an angle $a$ to the sliding surface 184 of a port plate 182. A pin 185 is disposed in the bore 183 and has one end 188 urged hydraulically into engagement with the sliding surface 186 of a housing 187 co-operating with the port plate 182. As the housing 187 rotates relative to the port plate 182, the pin 185 will also be forced to rotate about its longitudinal axis 189, this rotation preventing blockage of the bore 183. FIGURE 16 shows a similar arrangement but, in this case, the plane of the end 188 of the pin 185 is inclined at an angle $b$ to a plane disposed perpendicular to the axis 189. As the pin 185 rotates about its longitudinal axis 189, it will also perform an axial reciprocating movement. In order to ensure that uninterrupted rotation of the pin 185 shall take place, it is essential that the angle $b$ should be less than the angle $a$.

The embodiment shown in FIGURE 17 is similar to that shown in FIGURE 16 except that the end of the pin 185 is provided with a head 191 of substantially greater diameter than the rest of the pin. The head 191 is received within a recess 193 in the port plate 182 and is so shaped that the pin 185 will perform an axial reciprocating movement at the same time as it rotates about its longitudinal axis 189. However, the greater diameter of the head 191 ensures that a substantially greater turning moment will be applied to the pin 185 during operation than in the cases shown in FIGURES 15 and 16. Thus, any tendency of the pin 185 to drag without rotating is substantially reduced. A reciprocation of greater amplitude will also be produced.

It will be understood that the arrangements described with reference to FIGURES 10 to 17 are capable of application to hydraulic machinery other than the pump 1 or motor 2 previously set forth and that they may be employed in any cases in which two relatively slidable surfaces perform functions similar to those herein described.

The hydraulically operated transmission system which has just been described is well suited for employment in land vehicles since its use will allow the vehicles to be driven up to the same maximum speed either in a forward or reverse direction, the tractive force that the vehicle can exert also being the same in either direction. These considerations are of particular importance in the case of land vehicles such as agricultural tractors.

Figure 18:
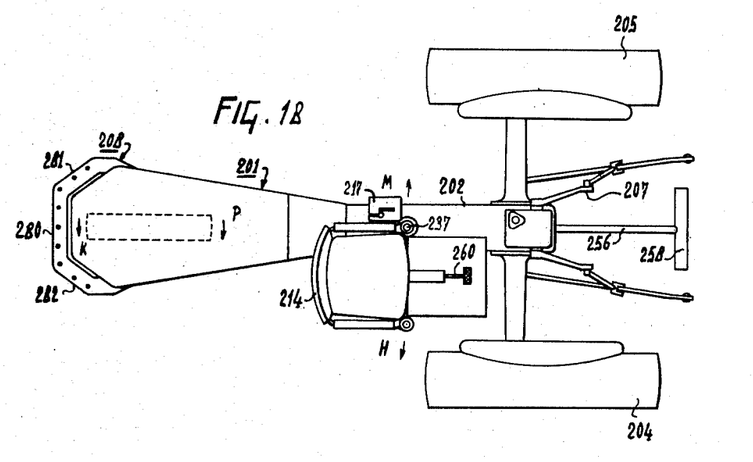
FIGURE 18 is a plan view of a tractor.
Figure 19:
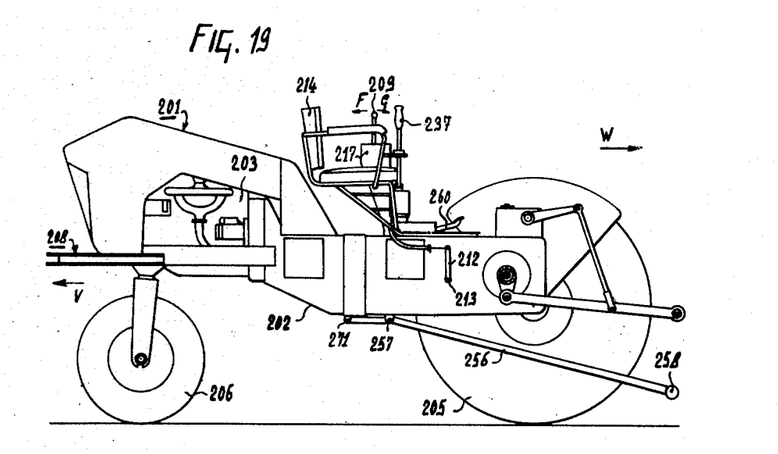
FIGURE 19 is a side elevation of the tractor shown in FIGURE 18.
Figure 20:
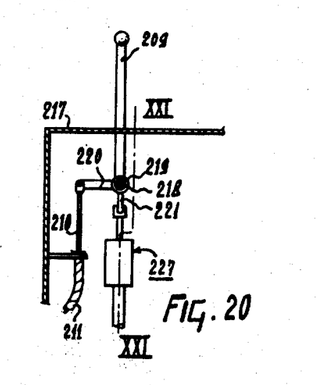
FIGURE 20 is an elevation, partly in section, showing, to an enlarged scale, part of the control mechanism of the tractor of FIGURES 18 and 19.
Figure 23:
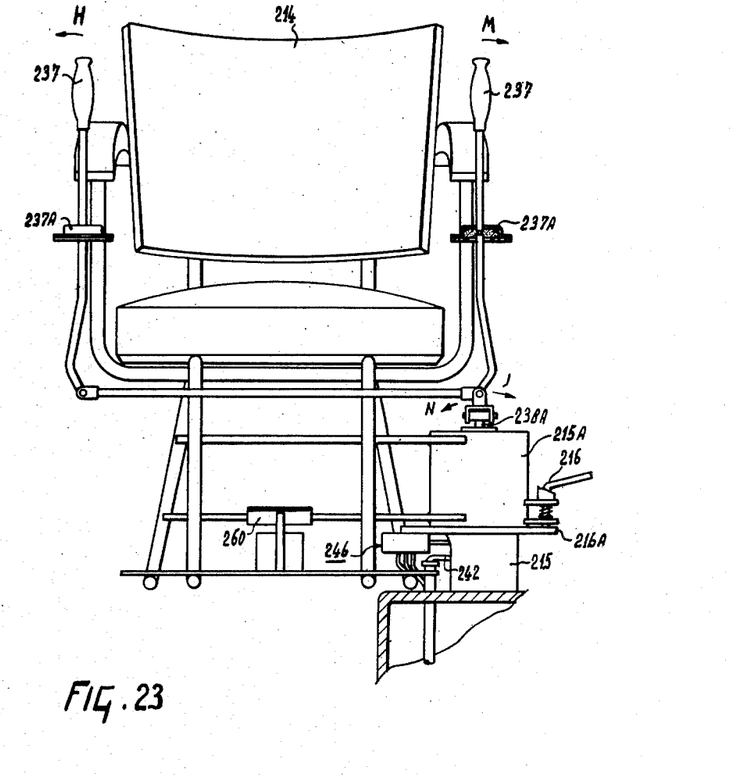
FIGURE 23 is a front elevation, partly in section, and on an enlarged scale, of the driving seat of the tractor shown in FIGURES 18 and 19.

FIGURES 18 and 19 show a tractor 201 having a chassis in which is arranged an hydraulically operated power transmission system 202. The transmission system 202 constitutes a connection between an internal combustion engine 203 and a pair of unsteerable rear wheels 204 and 205 (the wheel 204 being omitted in FIGURE 19 for the sake of clarity). The front end of the tractor is supported by a steerable wheel 206 and is provided with a mounting beam 208 while the rear end of the tractor is fitted with a lifting mechanism 207. The tractor 201 has a transmission control lever 209 which is connected by means of a flexible cable 210 with one end of a further lever 212. The cable 210 is adapted to slide within a protective sheath 211 in the manner of a Bowden cable (see FIGURE 20). The other end of the said further lever 212 is rigidly secured to a pivotal shaft 213 which, in turn, is connected with the control rod 91 previously described. The connection may, for example, be constituted by a pinion rigidly mounted on the shaft 213, the pinion having teeth in engagement with a toothed rack rigid with said control rod 91. The control lever 209 projects from the top of a control box 217 at a location which is always within reach of a driver's seat 214 which latter is mounted on a support 215 rigid with the tractor chassis in such a way as to be turnable about a substantially vertical axis (see FIGURES 23 and 24). The seat 214 can be secured in any of a number of different angular settings by means of a spring-loaded locking pin 216 carried by a cylindrical bracket 215A rigid with the seat, the bracket 215A being turnable about the support 215 and the locking pin 216 being adapted to engage in any one of a number of holes in a plate 216A rigid with the support 215.

A horizontal shaft 218 extends substantially laterally of the tractor 201 and is rigidly secured within the control box 217 (see FIGURES 20 to 22), the lever 209 being mounted on the shaft 218 by means of a sleeve 219 in such a way that it can be slid longitudinally of the shaft 218 and turned thereabout. The sleeve 219 also has an arm 220 secured to it at right angles to the lever 209 and a further arm 221 substantially co-axial with the lever 209. The outer end of the arm 220 is linked with the flexible cable 210 so that pivotal movement of the arm 209 about the said shaft 218 moves the control rod 91 either in the direction D or in the direction E shown in FIGURE 5. The upper surface of the control box 217 is provided with two parallel slots 222 and 223 and an interconnecting perpendicular slot 224 (see FIGURE 22), the transmission control lever 209 being movable along these slots at the will of the driver of the tractor 201. The slot 224 extends perpendicularly above and parallel to the shaft 218 and constitutes a "neutral" position of the transmission control lever 209. Compression springs 225 and 226 which are coiled around the shaft 218 on opposite sides of the sleeve 219 tend to hold the lever 209 in a position midway along the length of the slot 224 at times when the lever is disposed in that slot.

Figure 21:
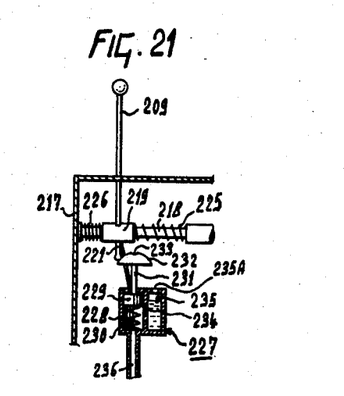
FIGURE 21 is a section taken on the line XXI—XXI of FIGURE 20.
Figure 22:
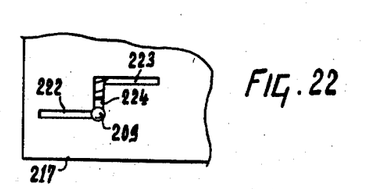
FIGURE 22 is a plan view corresponding to FIGURE 20.

Immediately beneath the shaft 218 is disposed a control valve generally indicated by the reference numeral 227. A rod 231 projects from the upper surface of the control valve 227 and is provided, at its upper end, with a body 232 having a convex cam surface in the center of which a concave recess 233 is formed. The lower end of the rod 231 is secured to a piston 229 which is slidable in a vertically disposed cylinder 228 towards the upper end of which it is urged by means of a compression spring 230. The lower end of the cylinder 228 has an outlet duct 236 while a bore 234 in the side of the cylinder communicates with an oil reservoir 235 whose upper end is open to the atmosphere through a hole 235A.

The rotatable seat 214 is provided with interconnected hand levers 237 which are mounted by means of universal joints 237A in such a way that they can be pivoted in any desired direction. The levers 237 serve to steer the tractor 201 and are coupled to a rod 238A which has a piston 238 at its lower end (see FIGURE 24). The piston 238 is slidable in a cylinder 239 whose longitudinal axis is in central position coincident with that of the aforementioned support 215 about which the seat 214 is rotatable. It will be seen that when the seat 214 is turned about the support 215, the interconnected levers 237 and the piston 238 will be similarly turned. The lower end of the cylinder 239 is connected to an arm 241 and the cylinder 239 with the arm 241 is pivotable about a horizontal pivot pin 240. The arm 241 is connected by means of a link 242 to the control members of a hydraulically energised steering mechanism (not shown). The arm 241 passes through an elongated slot 243 in a coupling ring 244 which latter is connected with a piston valve 245 by means of a piston rod 247. The piston valve 245 is slidably mounted in a cylinder 250 which comprises the major part of a hydraulic control member 246. The piston valve 245 is maintained in a central position in the cylinder 250 by means of two coiled compression springs 251 and 252 disposed at opposite ends of the cylinder 250. Three ducts, 253, 254 and 255 open into the side of the cylinder 250 and, when the piston valve 245 is in its central position, no intercommunication between any of these ducts is possible. The piston valve 245 has heads 248 and 249 of a diameter equal to that of the cylinder 250, the heads being interconnected by means of a section of substantially smaller diameter.

Figure 25:
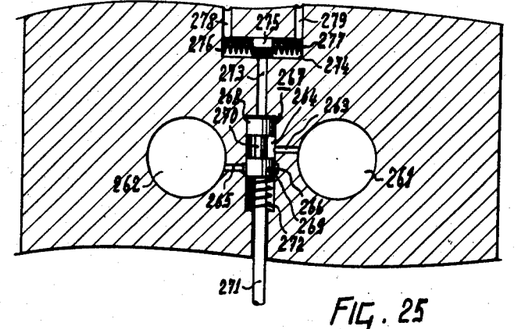
FIGURE 25 is a sectional elevation, on an enlarged scale, of part of the control mechanism of the tractor shown in FIGURES 18 and 19.

FIGURE 25 shows part of the transmission system 202 fitted to the tractor 201. Bores 261 and 262 are provided which correspond, for example, to the bores 63 and 64 shown in FIGURES 1 and 2 of the drawings. The bore 261 is connected to a cylinder 264 by means of a duct 263 and the bore 262 is similarly connected to the same cylinder 264 by means of a duct 265 which latter actually opens into an annular groove 266 formed in the wall of the cylinder 264 at a point remote from the opening of the duct 263. A piston valve 267 is slidable within the cylinder 264 and has heads 268 and 269 of a diameter equal to that of the cylinder 264, the said heads being interconnected by a section 270 of substantially smaller diameter. The piston valve 267 has a rod 271 rigidly secured thereto and is urged into a position at one end of the cylinder 264 as shown in FIGURE 25 by means of a coiled compression spring 272. The end of the cylinder 264 in front of the piston head 268 is connected by means of a duct 273 with the side of a cylinder 274 which contains a free piston 275 maintained in a central position closing the duct 273 by means of opposed coiled compression springs 276 and 277 disposed on opposite sides of the piston 275. The cylinder spaces on opposite sides of the said piston 275 are respectively connected to ducts 278 and 279.

The purpose and function of the various parts of the tractor which have just been described will now be explained. When the transmission control lever 209 is located in the "neutral" slot 224, the hydraulic motor 2 remains at rest and the ground wheels 204 and 205 of the tractor are not driven. When the lever 209 is moved in the direction F (see FIGURE 19) into the slot 222, the tractor moves forward in the direction indicated by the arrow V. Conversely, when the lever 209 is moved in the direction of the arrow G into the slot 223, the tractor moves rearwardly in the direction indicated by the arrow W. Thus, whether the seat 214 in the position shown in FIGURES 18 and 19 or is turned through 180° relative thereto, the tractor 201 will proceed in the same direction as the direction in which the lever 209 is displaced from the slot 224. As has been previously stated, the lever 209 tends to take up a central position in the slot 224 under the action of the springs 225 and 226. In order positively to prevent the wheels 204 and 205 from being driven when the lever 209 is in this central position, the lower end of the arm 221 (FIGURE 21) comes at such time into contact with the concave recess 233 in the cam-shaped body 232, thus depressing the piston 229 by means of the rod 231. Upon depression of the piston 229, the bore 234 is immediately closed so that no oil can flow from the cylinder 228 into the reservoir 235. Upon further depression of the piston 229, the oil then trapped in the cylinder 228 is forced down the duct 236, which duct communicates with the duct 278 shown in FIGURE 25. This oil will displace the free piston 275 to the right in FIGURE 25 so that the duct 273 comes into communication with the duct 278. The piston valve 267 will thus be moved downwardly in FIGURE 25 into a position in which the bores 261 and 262 are in open communication with one another via the ducts 263 and 265 and the cylinder space 264 around the piston valve section 270. The high pressure and low pressure sides of the transmission system are thus short-circuited so that it is impossible for drive to be imparted to the hydraulic motor 2. As soon as the control rod 209 is moved to a position in which the arm 221 is no longer in contact with the recess 233, the various springs 230, 277 and 272 return the parts 229, 275 and 267 to their original positions in which the short-circuit between the bores 261 and 262 is closed.

The rod 271 (FIGURES 19 and 25) is pivoted at its lower end to one end of a feeler arm 256. The feeler arm 256 has a fixed fulcrum 257 and, at its other end, is provided with a foot 258 which comes into contact with the ground if the tractor 201 "rears up" due to too heavy a load being connected thereto or due to the tractor meeting some immovable obstacle. As soon as the foot 258 comes into contact with the ground, the feeler arm 256 is turned about its fulcrum 257 and the rod 271 moves downwardly in FIGURE 25 into a position in which the aforedescribed short-circuit between the bore 261 and 262 is established. Drive to the rear wheels 204 and 205 is immediately discontinued so that it is impossible for the tractor 201 to "rear up" to an extent which would be likely to cause an accident.

The tractor 201 has a brake pedal 260 which, in addition to being connected to a conventional hydraulically operated braking mechanism which is not shown in the drawings, is connected to a control valve which is substantially identical to the control valve 227 shown in FIGURE 21. When the brake pedal 260 is depressed oil is forced down a duct which is similar to the duct 236 and which communicates with the duct 279 shown in FIGURE 25. The free piston 275 is thus displaced towards the left in FIGURE 25 and the short-circuit between the bores 261 and 262 is established in the manner previously described. Thus, the drive to the wheels 204 and 205 is discontinued simultaneously with the application of a braking force to these wheels. Furthermore, this arrangement makes it unnecessary to move the control lever 209 into the slot 224 in the event that sudden braking is necessary for an emergency stop or the like. When either the control valve just mentioned or the control valve 227 is actuated, the oil displaced in front of the free piston 275 passes through the duct 278 or 279 to the reservoir 235 or to the equivalent reservoir in the other control valve.

Figure 24:
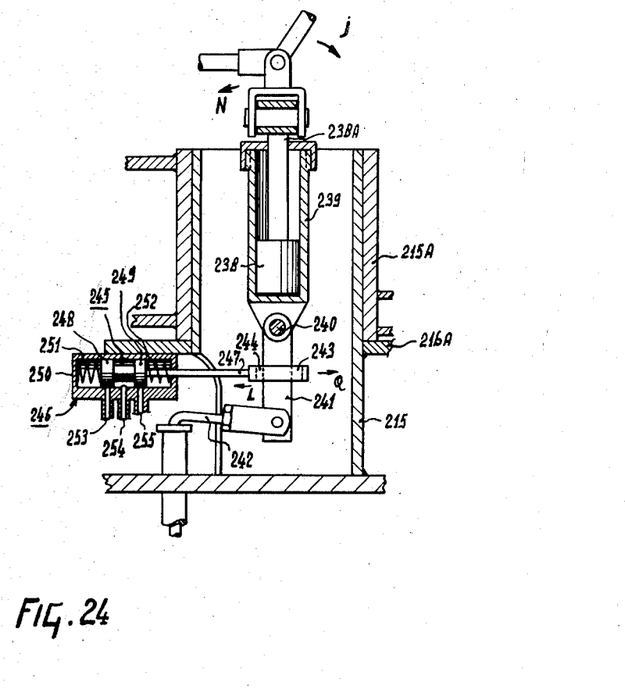
FIGURE 24 is a sectional elevation, on an enlarged scale, of part of the mechanism shown in FIGURE 23.

The hydraulic control member 246 (see FIGURE 24) is provided to assist the tractor in negotiating very steep bends. To this end the braking mechanism of the rear wheel 204 communicates with the duct 253 while that of the rear wheel 205 communicates with the duct 255. If, when the driver's seat 214 is in the position shown in the drawings, the levers 237 are moved in the direction of the arrow H (FIGURE 23), the cylinder 239 will turn about the pivot pin 240 in the direction indicated by the arrow J (FIGURE 24). If the levers 237 are only turned through a small angle the wheel 206 will be angularly adjusted through a similar small angle in the direction indicated by the arrow K (FIGURE 18) so that the tractor 201 turns in the direction in which the lever 237 is moved. The clearance between the arm 241 and the ring 244 is such that no movement of the rod 247 is produced under these circumstances. However, if the lever 237 should be turned through a large angle in the direction H, the lost motion connection between the arm 241 and the elongated slot 243 in the arm 244 is fully taken up and the rod 247 is moved in the direction indicated by the arrow L (FIGURE 24). The piston valve 245 is thus displaced to the left in FIGURE 24 so that the duct 253 is brought into communication with the duct 254 which leads to a source of oil under pressure. In this way the wheel 204 is brought to a stop due to actuation of its braking mechanism while the wheel 205 is free to continue rotating. Since the wheel 204 will be located on the inner side of the sharp bend, a turn of the said bend by the tractor 201 is greatly facilitated. When the levers 237 are turned through a large angle in the direction of the arrow M, the cylinder 239 is turned in the direction of the arrow N and the rod 247 and piston valve 245 are moved in the direction of the arrow Q. The duct 255 is thus brought into communication with the duct 254 so that a brake is applied to the wheel 205 whilst the wheel 204 is allowed to continue turning.

When the seat 241 is turned through, for example, 180° with respect to the position shown in the drawings, the piston 238 and the interconnected levers 237 will also be turned through 180° about the longitudinal axis of the cylinder 239. In the new position of the seat 214, the tractor 201 will still turn to the right when the lever 237 is turned to the right and the right-hand rear wheel will be braked if a turn of the levers 237 through a large angle is made. Corresponding changes of direction will, of course, be made if the levers 237 are turned to the left. Since the levers 237 can be turned in any direction, movements in directions corresponding to the directions H and M can be made in any intermediate position of the seat 214 such, for example, as when it is turned through 90° with respect to the position shown in the drawings. It will be apparent that the arrangements described above in connection with the braking of the tractor 201 can be employed with vehicles having transmissions other than the transmission system described with reference to FIGURES 1 and 2.

The mounting beam 208 at the front end of the tractor includes a portion 280 (FIGURE 18) which extends perpendicular to the straight line direction of travel of the tractor and also includes two portions 281 and 282 which are oppositely inclined to this direction. The arrangement is, in fact, such that the mounting beam 208 encloses the front end of the tractor and forms a protection for the engine 103 and radiator or like vulnerable parts which might otherwise be damaged if the front of the tractor 201 were to collide with some obstacle.

What we claim is:

1. A hydraulically operated power transmission system of the kind comprising a swash plate actuated multiple-piston pump adapted to supply hydraulic pressure medium to a similar swash plate actuated multiple-piston motor, the pump and the motor each including a housing formed with a plurality of chambers which receive their respective pistons, the pump housing and the motor housing each being rotatable about an axis, said swash plates being turnable about further axes which intersect and are substantially perpendicular to the first-mentioned axis to vary the transmission ratio of the system, coupling rods, said swash plates being arranged to be turnable with the aid of said coupling rods which are situated between said swash plates, the connection points of said coupling rods to said swash plates being situated at a distance from said first-mentioned axis when viewed in a direction perpendicular to a plane containing said first-mentioned axis and also said second-mentioned axes about which the swash plates are turnable for varying the transmission ratio, a control shaft turnable about its longitudinal axis which extends at least substantially parallel to the axes about which said swash plates are turnable for varying the transmission ratio, said coupling rods being coupled with said control shaft, the arrangement being such that said coupling rods are pivotable with respect to said control shaft about pivotal axes and a line joining the longitudinal axes of the control shaft to the pivotal axis of the pump swash plate coupling rod is inclined at substantially 90° to a similar perpendicular line joining the longitudinal axis of the control shaft to the pivotal axis of the motor swash plate coupling rod.

2. A system as claimed in claim 1, wherein the eccentricity of the pivotal axis of one coupling rod relative to the longitudinal axis of the control shaft is greater than that of the other.

3. A system as claimed in claim 2, wherein the eccentricity of the pivotal axis of the pump swash-plate coupling rod is the greater.

4. A system as claimed in claim 1, wherein the pump swash-plate and the motor swash-plate are each pivoted to one end of the corresponding coupling rod, and wherein each of these pivots is disposed at the same distance from a pivotal axis about which the corresponding swash-plate is adapted to turn.

5. A system as claimed in claim 1, a control shaft wherein each swash-plate is connected to said control shaft by means of a coupling rod, each coupling rod being pivoted to the control shaft in such a way that its pivotal axis is eccentrically arranged with respect to the longitudinal axis of the control shaft.

6. A hydraulically operated power transmission system of the kind comprising a swash plate actuated multiple-piston pump adapted to supply hydraulic pressure medium to a swash plate actuated multiple-piston motor, the pump and the motor each including a housing formed with a plurality of chambers which receive their respective pistons, the pump housing and the motor housing each being rotatable about an axis with at least one swash plate being turnable about a further axis which intersects and is substantially perpendicular to the first-mentioned axis to vary the transmission ratio of the system, a hydraulically operated mechanism operatively associated with said turnable swash plate for turning said swash plate about said second-mentioned axis, said hydraulically operated mechanism including a piston which is movable in a cylinder which during operation is adapted to be filled with a liquid pressure medium and further including a control rod which is slidable in a bore formed in the said piston, recesses and ducts being formed in the said bore and control rod whereby upon displacement of the control rod relative to the piston the opposite sides of the piston are brought into communication, the ducts and recesses being so dimensioned that the maximum speed at which the angularity of the swash plate or swash plates can be changed is insufficient to produce hydraulic pressures in the system which would be of such magnitude as to cause damage or breakdown of the various parts thereof.

7. A system as claimed in claim 6, wherein the piston is provided with an extension upon which is mounted a toothed rack, said toothed rack co-operating with a set of teeth rigidly secured to a control shaft to which latter at least one of said swash-plates is coupled, whereby a movement of said control shaft produces a change in the angularity of said swash-plate.

8. A system as claimed in claim 6, wherein a lost motion connection is provided between the control rod and the piston, whereby, in the absence of a supply of liquid pressure medium, the control rod can move the piston directly after said lost motion has been taken up.

9. A hydraulically operated power transmission system of the kind set forth wherein said system includes a pump having pistons and a pump swash plate for varying the strokes of said pump pistons, a motor having pistons and a motor swash plate for varying the strokes of said motor pistons, wherein the pump swash-plate is coupled to the motor swash-plate in such a way that a change in the angularity of one swash-plate is accompanied by change in the angularity of the other such that an increase in the lengths of the strokes of the pump pistons is accompanied by a dissimilar decrease in the lengths of the strokes of the motor pistons and vice versa, and wherein at least one of said swash-plates is turnable about a pivotal axis to vary the transmission ratio under the action of a hydraulically operated mechanism governed by a slidably mounted control rod, and wherein the hydraulically operated mechanism includes a piston which is movable in a cylinder which, during operation of the system, is adapted to be filled with a liquid pressure medium, and wherein the control rod is slidable relative to the piston, the piston having a surface on one side whose area subjected to liquid pressure is smaller than that of a surface on the opposite side, so that, when the piston is at rest in a state of equilibrium, the liquid pressure on the said one side of the piston is greater than that on the said opposite side, and wherein the control rod is slidable in a bore formed in the said piston, and wherein recesses and ducts are formed in the said bore and control rod in such a way that, upon displacement of the control rod relative to the piston, the opposite sides of the piston are brought into communication, and wherein the ducts and recesses are so dimensioned that the maximum speed at which the angularity of the swash-plate or swash-plates can be changed is insufficient to produce hydraulic pressures in the system which would be of a magnitude sufficient to cause damage to or breakdown of the various parts thereof.

10. A system as claimed in claim 9, wherein resilient means extends between the control rod and the piston, the resilient means being compressed during the taking up of the said lost motion connection.

11. A system as claimed in claim 9, wherein the cylinder communicates with a liquid filled space on that side of the piston to which a liquid pressure supply duct is connected, the communication being by way of a one-way valve so that, upon movement of the piston in the absence of a supply of liquid under pressure, liquid will be drawn through said one-way valve to maintain the said cylinder full of liquid.

12. A hydraulically operated power transmission system which includes two members having relatively slidable surfaces, wherein at least one groove is formed in the sliding surface of one of the members and is adapted to be supplied with liquid under pressure by way of a bore which is disposed at an angle to the said sliding surfaces and which houses a pin having one end in engagement with the sliding surface opposite to that into which said bore opens.

13. A system as claimed in claim 12, wherein the surface of the said end of the pin is disposed at right angles to the longitudinal axis of the pin.

14. A system as claimed in claim 12, wherein the surface of the said end of the pin is inclined to a plane lying perpendicular to the longitudinal axis of the pin.

15. A system as claimed in claim 14, wherein the angle by which the said end surface is inclined to a plane lying perpendicular to the longitudinal axis of the pin is smaller than the complement of the angle by which the bore is inclined to said sliding surfaces.

16. A system as claimed in claim 12, wherein the said end of the pin takes the form of a head having a diameter substantially greater than that of the body of the pin.

17. A hydraulically operated power transmission system of the kind comprising a swash plate actuated multiple-piston pump adapted to supply hydraulic pressure medium to a similar swash plate actuated multiple-piston motor, the pump and the motor each including a housing formed with a plurality of chambers which receive their respective pistons, the pump housing and the motor housing each being rotatable about an axis with at least one swash plate being turnable about a further axis which intersects and is substantially perpendicular to the first-mentioned axis to vary the transmission ratio of the system, a coupling rod, said one swash plate being arranged to be turnable with the aid of said coupling rod which is situated on the same side of the swash plate as the pistons, bearings turnably supporting said one swash plate, said bearings situated on relatively opposite sides of the first-mentioned axis about which the corresponding pump or motor housing is rotatable, the connection point of said coupling rod to said swash plate being situated at a distance from said first mentioned axis when viewed in a direction perpendicular to a plane containing said first mentioned axis and also said second-mentioned axis about which the swash plate is turnable for varying the transmission ratio, said pump and motor pistons being reciprocable in the chambers in directions parallel to said first-mentioned axis.

18. A system as claimed in claim 17 wherein the arrangement is such that the distance between the first-mentioned axis and the connection point of said coupling rod to said one swash plate is smaller than half of the outer diameter of the corresponding pump or motor housing then viewed in a direction parallel to said second-mentioned axis.

19. A system as claimed in claim 17 wherein the swash plate comprises a pivotable body situated in a casing.

20. A system as claimed in claim 19 wherein the end of the coupling rod which is connected to the swash plate is entered in a slot provided in the pivotable body.

21. A system as claimed in claim 19 wherein the arrangement is such that the distance between the axis of rotation and the connection point of the coupling rod to said one swash plate is smaller than half the diameter of the effective diameter of the swash plate when viewed in a direction parallel to the first-mentioned axis.

22. A system as claimed in claim 19 wherein the pivotable body is cylindrical, and wherein the longitudinal axis of the cylindrical body coincides with said second-mentioned axis.

23. A system as claimed in claim 19 wherein the corresponding pump or motor housing is disposed in part within a recess formed in the pivotable body.

24. A system as claimed in claim 19 wherein recesses are formed in sides of the body which extend substantially perpendicular to the axis about which the swash plate is turnable for varying the transmission ratio, said recesses being arranged to receive the bearings which pivotably support the body of the swash plate.

25. A system as claimed in claim 19 with a control shaft, wherein the coupling rod is connected to said control shaft which is turnable about its longitudinal axis, and wherein said longitudinal axis extends substantially parallel to the axis about which said swash plate is itself turnable for varying the transmission ratio, a mechanism being provided for turning each control shaft, said mechanism being situated substantially centrally above or below the corresponding pump or motor housing.

26. A system as claimed in claim 25 wherein the motor swash plate and the pump swash plate are both coupled with said control shaft by means of corresponding coupling rods, the arrangement being such that the coupling rods are disposed on relatively opposite sides of the said mechanism.

27. A system as claimed in claim 25 wherein the arrangement is such that in at least one position of said control shaft the distance between at least a part of the end of the coupling rod connected to said control shaft and said axis of rotation is smaller than half the diameter of the effective diameter of the swash plates when viewed in a direction parallel to said second-mentioned axis.

28. In a hydraulically operated power transmission system of the kind comprising a swash plate actuated multiple piston pump adapted to supply hydraulic pressure medium to a multiple piston motor, means provided to change the angularity of the pump swash plate relative to the pump housing and to vary the transmission ratio between the said pump and motor wherein the relative angularity of the pump swash plate and the pump housing is arranged to be varied under the action of a hydraulically operated mechanism which includes a piston that is movable in a cylinder which during operation of the system is filled with a hydraulic pressure medium, a control rod which is slidable relative to the piston, a lost motion connection provided between the control rod and the piston whereby in the absence of a supply of hydraulic pressure medium the control rod can move the piston directly after said lost motion has been taken up.

29. A system as claimed in claim 28 wherein the control rod is slidable in a bore formed in the said piston and wherein recesses and ducts are formed in the said bore and control rod in such a way that upon displacement of the control rod relative to the piston the opposite sides of the piston are brought into open communication, and wherein the piston has a surface on one side whose area subjected to hydraulic pressure is smaller than that of a surface on the opposite side whereby when the piston is at rest in a state of equilibrium the hydraulic pressure on said one side of the piston is greater than that on said opposite side.

30. A system as claimed in claim 29 wherein the arrangement of ducts and recesses is such that upon said displacement of the control rod relative to the piston liquid from a relatively low pressure side of the piston can flow through the ducts and recesses to a receiver space therefor and liquid from a relatively high pressure side of the piston can flow to the low pressure side.

31. A system as claimed in claim 28 wherein the piston is provided with an extension upon which is mounted a toothed rack, said toothed rack co-operating with a set of teeth rigidly secured to a control shaft to which latter said swash plate is coupled whereby a movement of said control shaft produces a change in the angularity of said swash plate.

32. A system as claimed in claim 28 wherein resilient means extend between the control rod and the piston, the resilient means being compressed during the taking up of the said lost motion connection.

33. A system as claimed in claim 28 wherein the cylinder communicates with a hydraulic liquid filled space on that side of the piston to which a hydraulic liquid pressure supply duct is connected, the communication being by way of a one-way valve so that upon movement of the piston in the absence of a supply of liquid under pressure liquid will be drawn through said one-way valve to maintain the said cylinder full of liquid.

References Cited in the file of this patent

UNITED STATES PATENTS

| | | |
|---|---|---|
| 1,080,282 | Kellogg | Dec. 2, 1913 |
| 1,212,655 | Magie et al. | Jan. 16, 1917 |
| 1,407,047 | Trowbridge | Feb. 21, 1922 |
| 1,808,217 | Garson | June 2, 1931 |
| 2,151,415 | Bennetch | Mar. 21, 1939 |
| 2,255,993 | Wahlmark | Sept. 16, 1941 |
| 2,377,303 | Acton | June 5, 1945 |
| 2,454,999 | Eaton | Nov. 30, 1948 |
| 2,474,961 | Sneed | July 5, 1949 |
| 2,570,843 | Orshansky | Oct. 9, 1951 |
| 2,592,592 | O'Neill | Apr. 15, 1952 |
| 2,604,856 | Henrichsen | July 29, 1952 |
| 2,613,756 | Smith | Oct. 14, 1952 |
| 2,737,900 | Smith | Mar. 13, 1956 |
| 2,788,636 | Badalini | Apr. 16, 1957 |
| 2,910,008 | Weisenbach | Oct. 27, 1959 |

FOREIGN PATENTS

| | | |
|---|---|---|
| 433,450 | Germany | Aug. 31, 1926 |